United States Patent [19]

Okumura

[11] Patent Number: 5,017,823

[45] Date of Patent: May 21, 1991

[54] VIBRATION WAVE DRIVEN ACTUATOR

[75] Inventor: Ichiro Okumura, Yokohama, Japan

[73] Assignee: Canon Kabushiki Kaisha, Tokyo, Japan

[21] Appl. No.: 408,328

[22] Filed: Sep. 18, 1989

[30] Foreign Application Priority Data

Sep. 19, 1988 [JP] Japan .................. 63-234269

[51] Int. Cl.$^5$ ............................................. H01L 41/08
[52] U.S. Cl. ............................................. 310/323
[58] Field of Search ............... 310/323, 328, 348–356

[56] References Cited

U.S. PATENT DOCUMENTS

| | | | |
|---|---|---|---|
| 3,566,164 | 2/1971 | Boillat et al. | 310/352 X |
| 3,735,166 | 5/1973 | Bradley | 310/352 |
| 4,152,616 | 5/1979 | Ozbirn et al. | 310/352 X |
| 4,634,915 | 1/1987 | Mukoujima et al. | 310/323 |
| 4,649,311 | 3/1987 | Mukohjima et al. | 310/328 X |
| 4,692,651 | 9/1987 | Hiramatsu et al. | 310/323 |
| 4,771,203 | 9/1988 | Mukohjima et al. | 310/323 |

FOREIGN PATENT DOCUMENTS

| | | | |
|---|---|---|---|
| 0096183 | 5/1985 | Japan | 310/323 |
| 62-213585 | 8/1987 | Japan . | |

Primary Examiner—Mark O. Budd
Attorney, Agent, or Firm—Fitzpatrick, Cella, Harper & Scinto

[57] ABSTRACT

In a vibration wave motor disclosed in this specification, at least one straddling member is coupled to a vibration member along the direction of travel of a traveling vibration wave in such a manner as to straddle between two points having a spacing corresponding to ($\lambda/2+n\lambda$) (n being an integer including zero), and the straddling member is rotatably coupled to a fixed member at the central position between the two coupling points of the straddling member.

27 Claims, 7 Drawing Sheets

VIBRATION WAVE DRIVEN ACTUATOR

BACKGROUND OF THE INVENTION

1. Field of the Invention

This invention relates to a vibration wave driven actuator for effecting relative movement of a vibration member and a member being in contact therewith by a travelling vibration wave generated by the vibration member, and more particularly to a support device for supporting and fixing the vibration member relative to a fixed member without hampering vibration.

2. Related Background Art

Vibration wave motors utilizing a travelling vibration wave have recently been put into practical use and the epitome of the principle thereof is as follows.

A ring-like vibration member of resilient material whose full circumferential-length is as great as integer times a certain length λ having two circumferentially arranged groups of piezo-electric elements (hereinafter referred to as the A piezo-electric element group and the B piezoelectric element group) secured to one surface thereof is used as a stator. These piezo-electric elements are arranged at a pitch of λ/2 and so as to be alternately opposite in constructiveness in the A and B groups, respectively, and are disposed so that there is deviation as great as odd number times λ/4 between the A and B groups. Electrode films are applied to the A and B groups of the piezo-electric elements. If an AC voltage is applied to only one of the two groups, for example, the A groups, there is generated in the vibration member over the full circumference thereof a standing wave (wavelength λ) of outside—the surface vibration which is a flexural vibration in which the central point of each piezo-electric element of the A group and a point distant by λ/2 therefrom are the positions of antinode and the middle point between the positions of antinode is the position of node (hereinafter referred to as the standing wave A). If an AC voltage is applied to only the B group, there is likewise generated a standing wave (hereinafter referred to as the standing wave B), but the positions of the antinode and node thereof deviate by λ/4 relative to the standing wave A. If AC voltages of the same frequency and having a time phase difference of π/4 are applied to the A and B groups at a time, there is generated in the vibration member a travelling wave (wavelength λ) of flexural vibration travelling in the circumferential direction, as a result of the combination of the standing waves of the two, and at this time, each point on the other surface of the vibration member having a thickness effects a kind of elliptical movement. Consequently, if a ring-like movable member as a rotor is brought into pressure contact with said other surface of the vibration member, the movable member is subjected to a circumferential frictional force from the vibration member and is rotatively driven. The direction of that rotation can be reversed by changing over the phase difference between the AC voltages applied to the A and B piezo-electric element groups to the positive or the negative. What has been described above is the epitome of the principle of the vibration wave motor of this kind.

On the other hand, as regards the supporting of the travelling vibration wave motor, it is difficult to fix the vibration member without spoiling vibration energy because in the vibration member, there is not a point which is not displaced at all, i.e., a node of vibration, and usually the vibration member is fixed to the fixed member with a flexible material such as a felt interposed therebetween.

Also, there has been proposed a structure in which as disclosed in U.S. Pat. No. 4,634,915, an auxiliary vibrator is provided on the vibration member to support the latter.

However, in the support structure using felt or the like as described above, accurate positioning of the vibration member is impossible and there is a disadvantage that the vibration insulating effect is deteriorated by a change with time, etc., and moreover, although the support against the pressure force of the rotor is possible, it is nearly impossible to support the reaction force of the driving force and therefore, another member as disclosed in Japanese Laid-Open Patent Application No. 62-213585 has been required for the reaction force of the driving force.

Also, in the support structure using the auxiliary vibrator as shown in U.S. Pat. No. 4,634,915, the fixed portion cannot be a completely fixed end and therefore, vibration is propagated to the fixed member or the vibration of the vibration member is disturbed and in addition, the auxiliary vibrator requires a predetermined length in a direction perpendicular to the direction of travel of the travelling wave of the vibration member, and this has led to the disadvantage that a large space is occupied and the volume of the entire motor becomes large.

SUMMARY OF THE INVENTION

It is an object of the present invention to provide a support device for a vibration wave driven actuator which can support a vibration member without hampering the vibration of the vibration member.

It is another object of the present invention to provide a support device for a vibration wave driven actuator which can support a vibration member relative to a fixed member by a simple structure and without being made bulky.

Other objects of the present invention will become apparent from the following detailed description of the invention.

DESCRIPTION OF THE PREFERRED EMBODIMENTS

Figure 1:
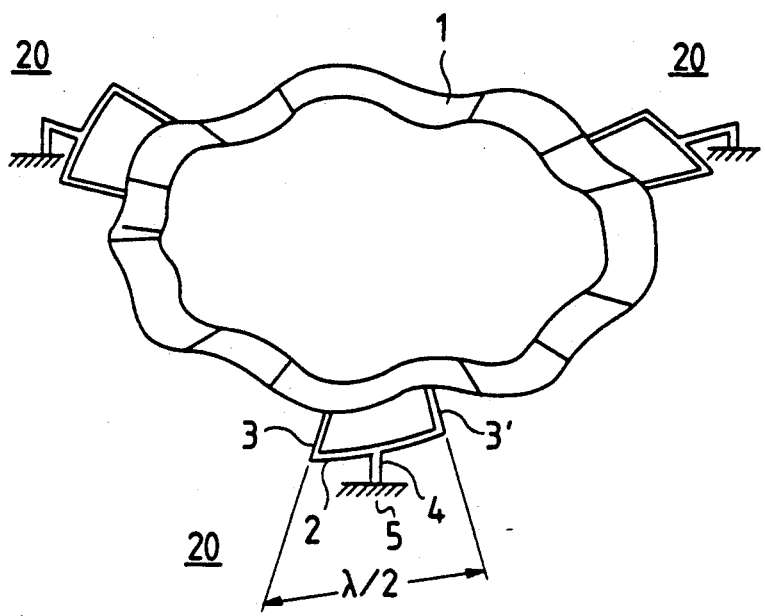
FIG. 1 is a schematic perspective view showing Embodiment 1 of a support device for a vibration wave motor according to the present invention.

The present invention will hereinafter be described in detail with respect to some embodiments thereof shown in the drawings. Embodiment 1

FIG. 1 is a perspective view showing Embodiment 1 of a support device for a vibration wave driven actuator according to the present invention.

This embodiment is a support device for a ring-like vibration wave motor.

The structure of the other vibration wave motor than this support device is the same as the structure disclosed in the aforementioned publication and therefore need not be described.

The reference numeral 1 designates a ring-like vibration member vibrating by a travelling wave of wavelength $\lambda$. A moving member, not shown, formed by a rotor, paper, film or the like is brought into pressure contact with the upper surface of the vibration member 1.

The reference numeral 20 denotes a support device for supporting and fixing the vibration member 1 to a fixed member 5, and in the present embodiment, three sets of such support devices are provided on the outer peripheral portion of the vibration member 1 along the circumferential direction thereof.

Each of these support devices 20 comprises a bar-like rod portion 2 having a length $\lambda/2$, a pair of coupling shafts 3 and 3' coupled to the outer peripheral portion of the vibration member 1, and a pivot shaft 4 rotatably fitted to the fixed member 5, said coupling shafts 3 and 3' and said pivot shaft 4 being provided on the same axis at the opposite ends and the center of the length of the rod portion 2, and in case of linear type movable member, the axes of the coupling shafts 3 and 3' and the pivot shaft 4 are parallel to one another and orthogonal to the axis of the rod portion 2.

Figure 2A:
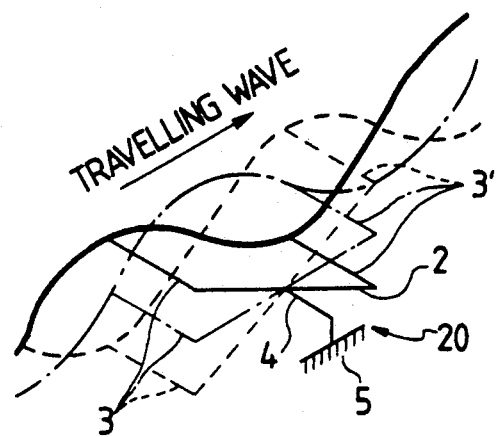
FIG. 2A is a perspective view showing a vibrated state.
Figure 2B:
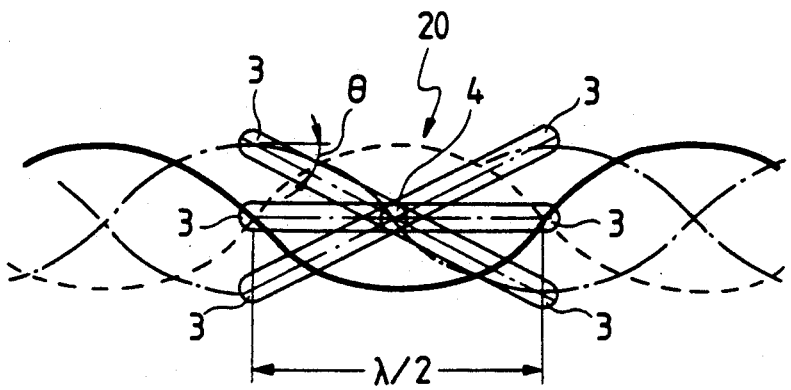
FIG. 2B is a view of the support device of Embodiment 1 as seen from within a vibration member.

That is, as shown in FIGS. 2A and 2B, when the vibration member 1 vibrates with a wavelength $\lambda$, the coupling shafts 3 and 3' coupled to two points spaced apart from each other by a distance $\lambda/2$ in the direction of vibration of the vibration member 1 vibrate vertically and the rod portion 2 rotatively vibrates at an amplitude $\theta$, but the midpoint of the coupling shafts 3 and 3' is not displaced at all. Accordingly, by providing the pivot shaft 4 at the position of this midpoint and rotatably fitting the pivot shaft 4 to the fixed member 5, rotation of the rod portion 2 is permitted and the movements of the vibration member 1 in the circumferential direction, the vertical direction and the horizontal direction are controlled without the vibration of the vibration member 1 being hampered. In this case, the number of vibration of the rotative vibration force to which the rod portion 2 is subjected is the driving frequency of the vibration wave motor, but if the lowest order flexural vibration frequency of the flexural vibration of this rod portion 2 is made greater than the driving frequency, the rotative vibration of the rod portion 2 becomes approximate to rigid body movement. Accordingly, it does not happen that the rod portion 2 causes flexural vibration and the stress caused thereby is exerted on the pivot shaft 4. Embodiment 2

Figure 3:
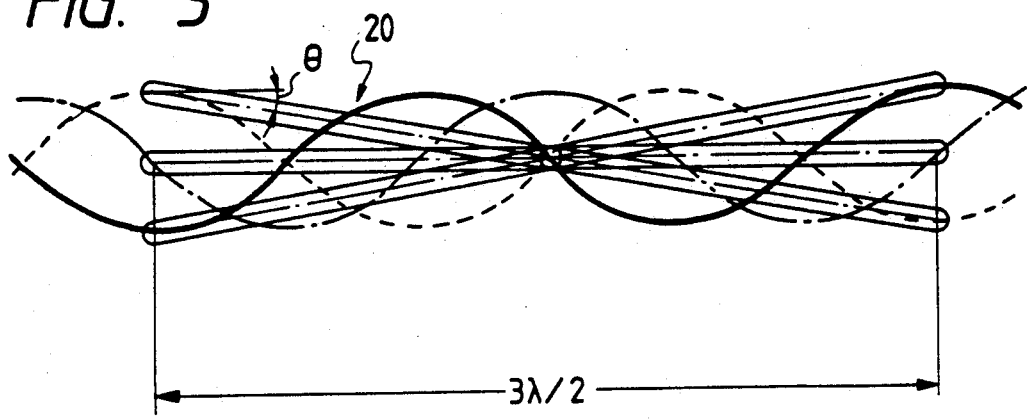
FIG. 3 shows Embodiment 2 of the support device as seen from within the vibration member.

FIG. 3 shows Embodiment 2. In the present embodiment, the spacing between the coupling shafts 3 and 3' is $3\lambda/2$, and the angle of rotation $\theta$ of the rod portion 2 is small as compared with that when the spacing is $\lambda/2$.

Accordingly, the stress exerted on the coupling shafts 3 and 3' and the pivot shaft 4 can be made small, and the vibration energy propagated to the fixed member 5 can be made small and the disturbance to the vibration of the vibration member 1 can also be made small. The greater is n (an integer) of the spacing $(\lambda/2+n\lambda)$ between the coupling shafts 3 and 3', the better is the result, but if the spacing is made great, the disadvantage that the neutral frequency of the rod portion 2 becomes lower becomes more conspicuous and in practice, $0 \leq n \leq 3$ is suitable.

Also, the flexural neutral surface of the vibration member 1 is a position at which displacement is least in the vibration member and therefore, it is most suitable to provide the coupling shafts 3 and 3' on the neutral surface as shown in FIGS. 2 and 3.

Figure 4:
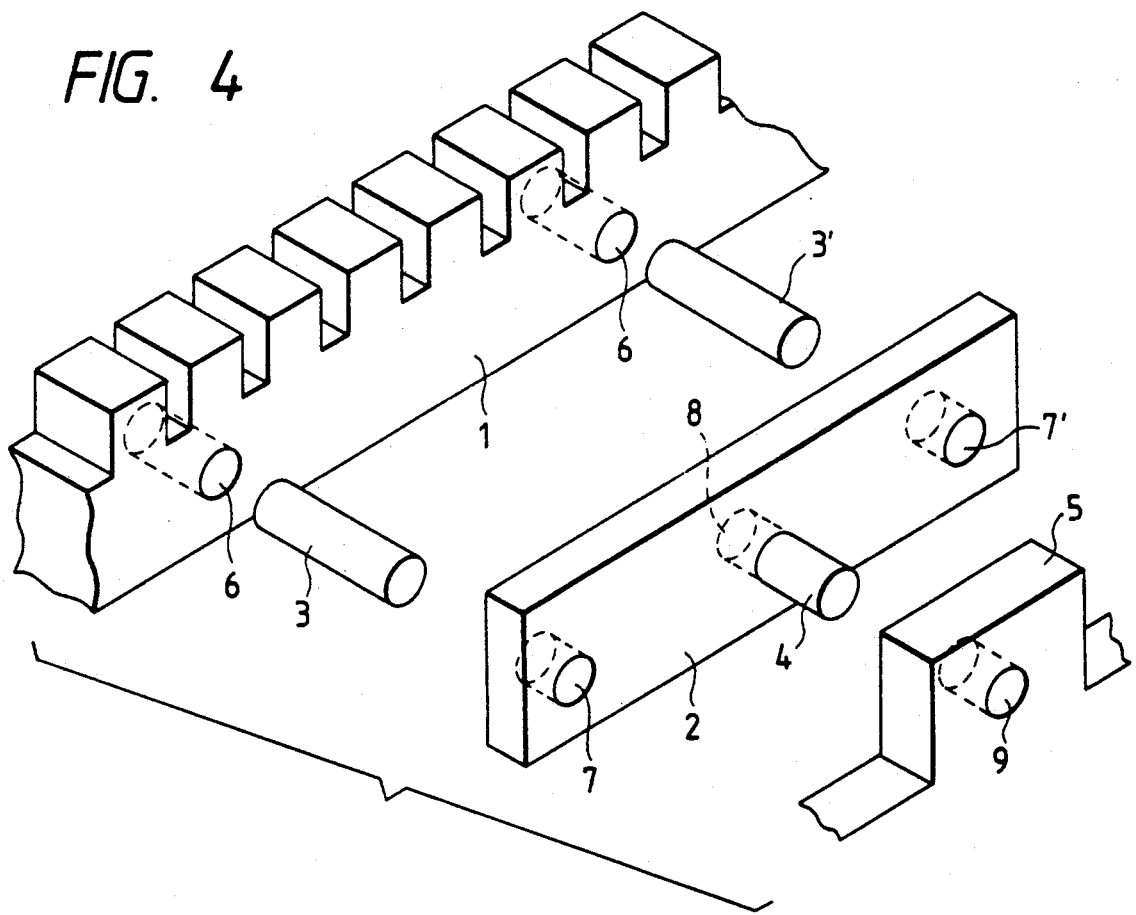
FIG. 4 is an exploded perspective view showing an example of the specific construction of the support device.

FIG. 4 is an exploded perspective view showing an example of the support device 20. The rod portion 2 is formed into a planar shape, and shaft holes 7 and 7' into which one end portion of the coupling shafts 3 and 3' is fitted are formed in the opposite end portions of the rod portion 2 at a distance $\lambda/2$, therebetween, and a shaft hole 8 into which one end portion of the pivot shaft 4 is fitted is formed in the rod portion 4 at the intermediate position between the shaft holes 7 and 7'.

On the other hand, the vibration member 1 is formed with shaft holes 6 and 6' into which the other end portions of the coupling shafts 3 and 3' are fitted, and the fixed member 5 is formed with a shaft hole 9 into which the other end portion of the pivot shaft 4 is fitted. If the fitting of the coupling shafts 3 and 3' to the shaft holes 6 and 6' or the fitting of the coupling shafts to the shaft holes 7 and 7' of the rod portion 2 is made loose so as to permit free rotation of the coupling shafts, no torsional force will be exerted on the pivot shaft 4 and the propagation of vibration will be decreased. This also holds true of the fitting of the pivot shaft 4 to the shaft hole 8 or the shaft hole 9.

Figure 5:
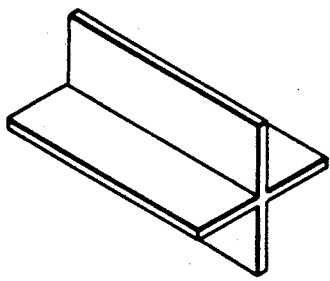
FIGS. 5 to 7 are perspective views showing other embodiments of a coupling shaft (a pivot shaft).
Figure 6:
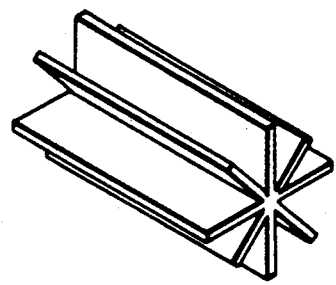
Figure 7:
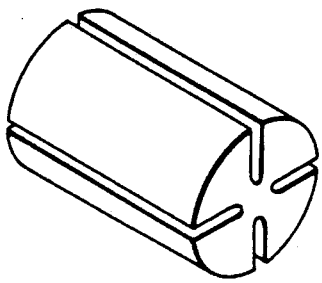

Further, if the coupling shafts 3 and 3' and the pivot shaft 4 are made into a shape having radial cross-sections as shown in FIG. 5, 6 or 7, better absorption of torsional stress will be provided.

That is, such shapes are high in rigidity for bending and therefore can reliably support the vibration member against the pressure force and driving reaction force of the rotor, and is low in torsional rigidity and therefore can absorb any torsion. Since this absorption is not the absorption by slip, the loss of vibration energy is small and the efficiency of the motor is not spoiled.

Also, the shape of the coupling shafts may be a combination of the pin shape as shown in FIG. 4 and the radial shape as shown in FIG. 5.

Further, in Embodiment 1 of FIG. 1, the ring-like vibration member 1 is supported from the outer side thereof, but alternatively, it may be supported from the inner side thereof. Embodiment 3

Figure 8:
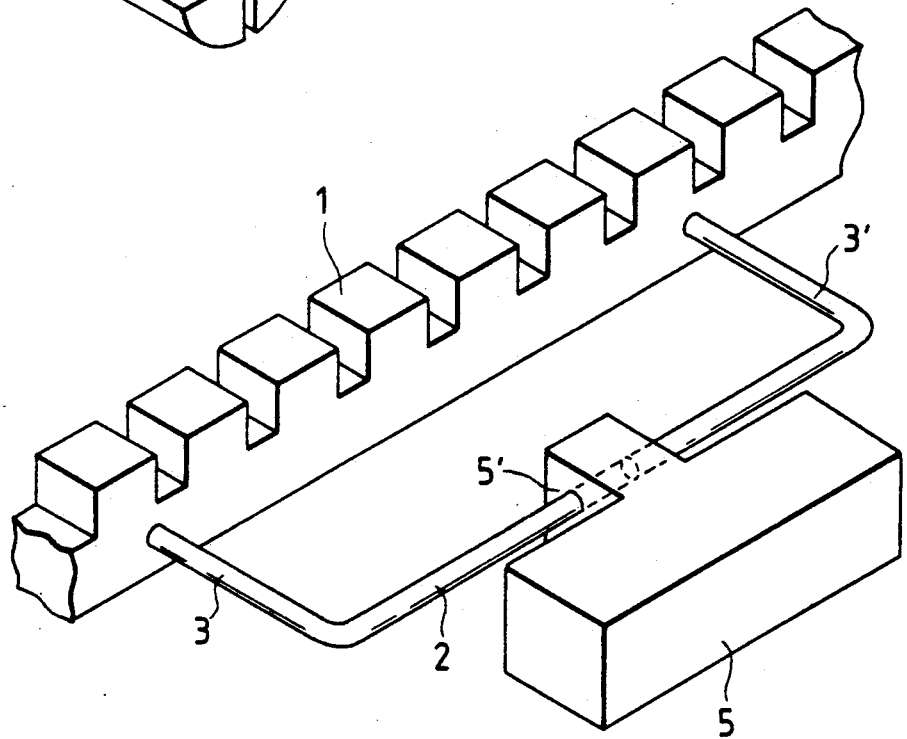
FIG. 8 is a perspective view of Embodiment 3.

FIG. 8 shows Embodiment 3.

In this embodiment, a bar-like member is used, and coupling shafts 3 and 3' are bent and formed at the opposite ends of a rod portion 2 which is extended into a shaft hole 5' formed in a fixed member 5 so that the rod portion 2 is fixed at its middle portion, and this embodiment reduces the number of parts and provides a structure easy to make.

In the above-described embodiments, the vibration member is fixed and the moving member is moved in conformity with the travelling vibration wave, but alternatively, for example, a vibration member (not shown) may be brought into pressure contact with a planar support member (not shown) and the vibration member itself may be designed to be moved by a travelling vibration wave generated on the vibration member.

FIG. 9 shows a fourth embodiment of the present invention.

Figure 9A:
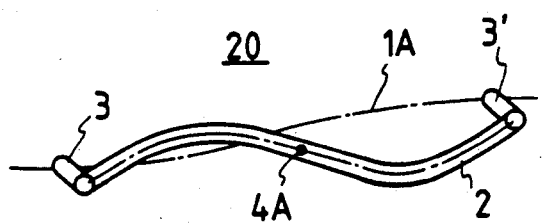
FIGS. 9A–9C are perspective views of the essential portion of a support device for a vibration wave motor according to another embodiment of the present invention showing the deformed states of the rod portion of the support device.
Figure 9B:
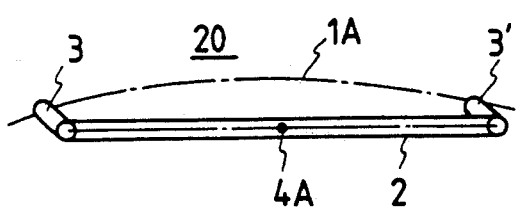
Figure 9C:
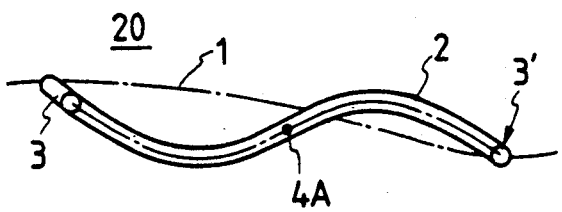

FIGS. 9A, 9B and 9C are fragmentary enlarged views of another example of the support device 20, and show the deformed states of the support device 20 at each ¼ period of the vibration of the vibration member 1. The rod portion 2 is coupled to the coupling shafts 3 and 3' at the end portions thereof, and the spacing between the coupling shafts 3 and 3' is set to $(n+\frac{1}{2})$ times the wavelength $\lambda$ of the flexural vibration of the vibration member 1.

At this time, the natural frequency of the secondary bending mode of the rod portion 2 is approximate to the frequency of driving vibrations of the vibration member 1 (in this case, this frequency of vibrations is equal to the driving frequency applied to the piezo-electric elements) and therefore, the rod portion 2 effects flexural vibration of the secondary mode in which there are two loops as shown in FIG. 9.

In this case, the coupling point 4A between the pivot shaft 4 (not shown) rotatably fitted to the fixed member 5 as shown in the above-described embodiments and the rod portion 2 is immovable as shown in FIGS. 9A–9C and therefore, the adverse effect of the fixed member 5 does not appear in the vibration of the vibration member 1.

Thus, according to such construction, there is provided a support device in which the loss of vibration of the vibration member 1 is small.

Dot-and-dash line 1A indicates the neutral plane in the flexural vibration of the vibration member 1 to which the coupling shafts 3 and 3' are fixed, and the flexural travelling wave travels from the right to the left.

Figure 10A:
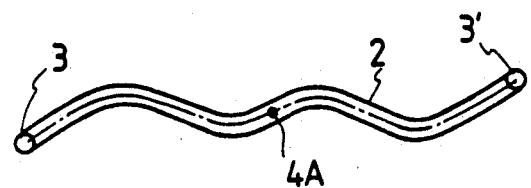
FIGS. 10A–10C are perspective views of the essential portion of a support device for a vibration wave motor according to still another embodiment of the present invention.
Figure 10B:
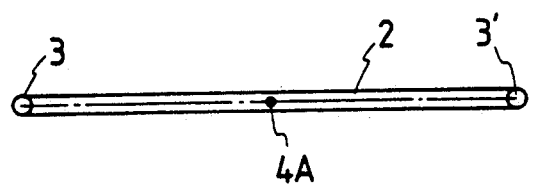
Figure 10C:
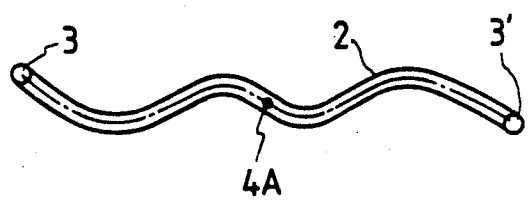

FIGS. 10A–10C show an example of the support device in which the rod portion 2 flexuraly vibrates in the fourth mode vibration having four loops, and the other elements are the same as those in FIG. 9.

Figure 11:
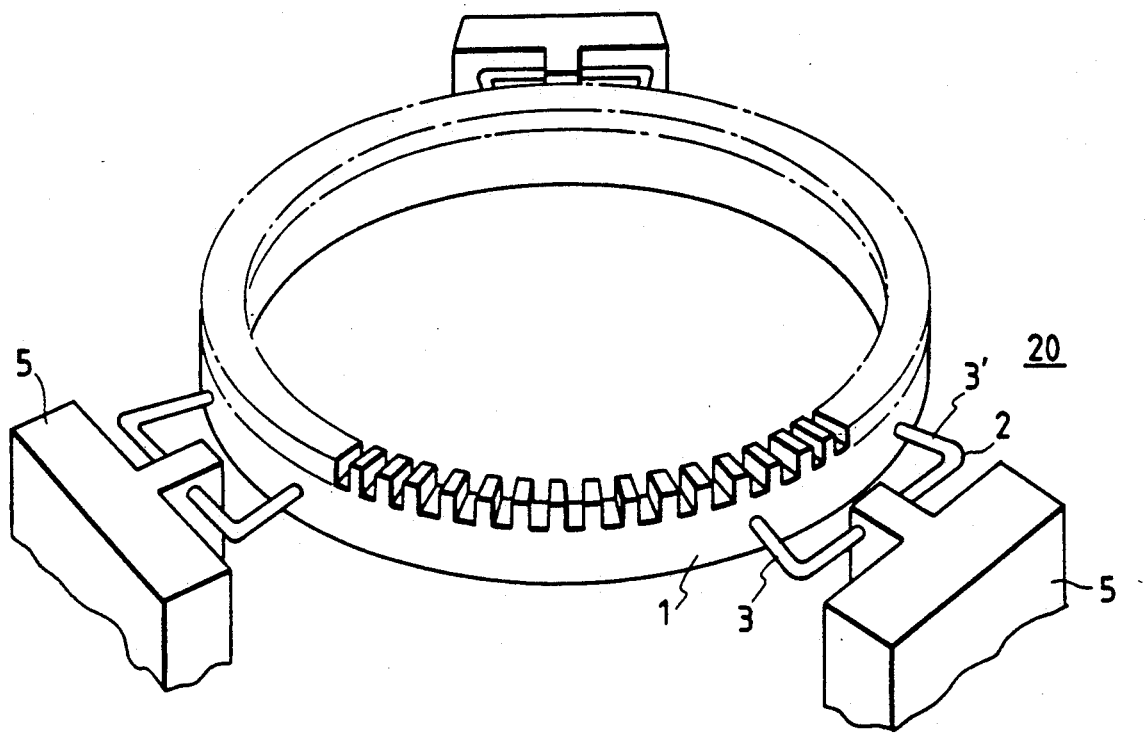
FIG. 11 is a perspective view of the essential portions of a vibration wave motor to which the support device shown in FIG. 9 or 10 is applied.

FIG. 11 is a perspective view of an example in which the support device 20 shown in FIG. 9 or 10 is applied to a ring-like vibration wave motor.

Figure 12:
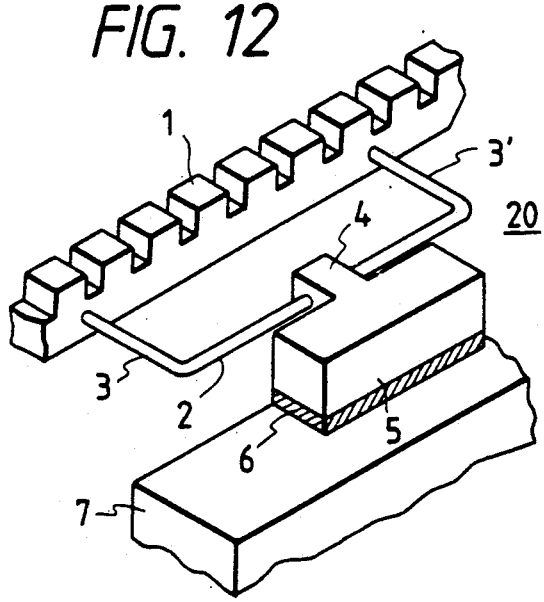
FIGS. 12 to 16 are perspective views of the essential portions of other embodiments of the support device.

FIG. 12 is a perspective view of the essential portions of a support device 20 for a vibration wave motor according to another embodiment of the present invention. In this embodiment, a vibration attenuating material 6 is attached to the fixed member 5 so that in the case of the vibration of the regular driving mode of the vibration member 1 based on the arrangement of piezo-electric elements (not shown), for example, the seventh mode in which the number of vibration waves is seven, vibration is not attenuated and in the case of the vibration of the other mode, i.e., the mode undesirable to the motor in which vibration is generated by the friction between the vibration member 1 and the rotor which is in contact therewith (for example, the vibration of the tertiary mode in which the number of vibration waves is three), vibration is attenuated.

When the vibration member 1 is vibrating in only the aforementioned regular driving mode, the fixed member 5 hardly vibrates as described in the previous embodiment and therefore, the vibration of the vibration member 1 is hardly attenuated by the vibration attenuating material 6. The vibration attenuating material 6 may be a visco-elastic material such as butyl rubber, neoprene rubber, plastics or both-surface tape.

However, when the aforedescribed undesirable other mode than the regular driving mode occurs to the vibration member 1 for some reason or other, the pivot shaft 4 is not stationary but vibrates because the spacing between the coupling shafts 3 and 3' is not $\lambda/2$ of the aforedescribed other vibration mode. Thereby the fixed member 5 is vibrated and therefore, vibration distortion in the direction of thickness of created in the attenuating material 6, whereby unnecessary vibration of the pivot shaft 4 is attenuated.

That is, according to this embodiment, the vibration of the regular driving mode is not attenuated but the other unnecessary vibrations are attenuated and therefore, no noise is produced from the motor. The reference numeral 7 designates a support bed for supporting the support device 20, and this support bed 7 is coupled to the case or the like of the motor.

Figure 13:
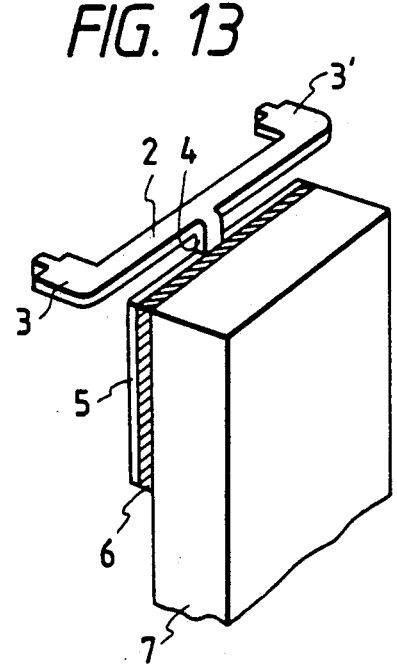

FIG. 13 shows an embodiment in which the rod portion 2 and the fixed member 5 are made integral with each other. In this embodiment, shearing distortion in the direction of surface is created in the attenuating material 6 with a result that unnecessary vibrations are attenuated. In this case, the pivot shaft 4 and the fixed member 5 are rotatably coupled together (in FIG. 13, for simplicity, this coupled portion is not shown), but alternatively, the pivot shaft 4 and the fixed member 5 may be secured to each other and the rigidity of the pivot shaft 4 may be made small to such an extent that the rod portion 2 can pivotally move.

Figure 14:
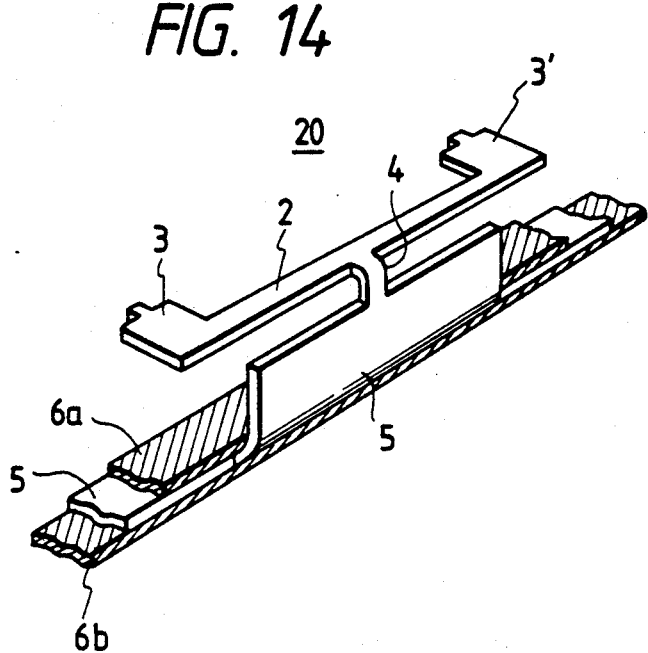

FIG. 14 is a perspective views of the essential portions of another embodiment of the support device 20 in which the rod portion 2 and the fixed member 5 are made integral with each other, while the fixed member 5 is interposed between two sheets of attenuating materials 6a and 6b to thereby further enhance the attenuating effect.

Figure 15:
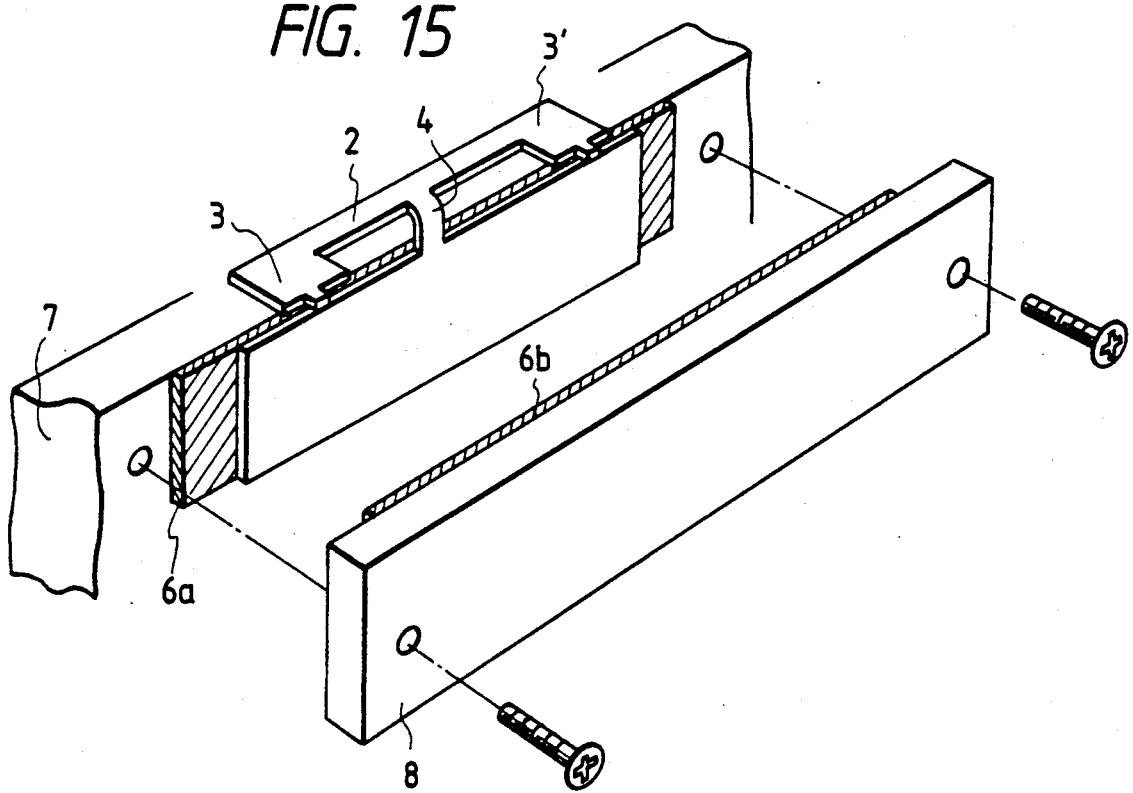

FIG. 15 is a perspective view of the essential portions of still another embodiment of the support device 20 in which the both sides of attenuating materials 6a and 6b are held down by hard members 7 and 8 of a metal or the like to thereby still further enhance the attenuating effect.

Figure 16:
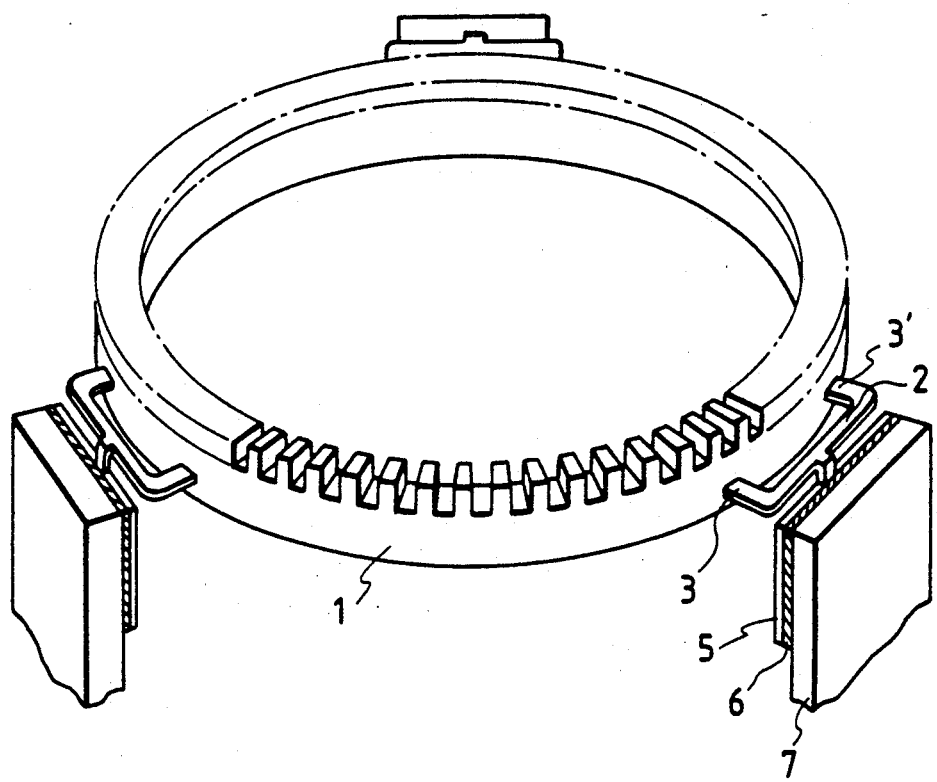

FIG. 16 is a perspective view of the essential portions of an example in which the support device 20 of FIG. 13 is applied to a ring-like vibration wave motor.

As described above, according to the present invention, the vibration member can be reliably supported without the vibration energy thereof being spoiled, and the efficiency of the vibration wave motor can be increased.

In the above-described embodiments, when the wavelength of the vibration wave generated in the vibration member is $\lambda$, support members 2 and 3 are provided for the vibration member with a spacing corresponding to $\lambda/2 + n\lambda$ (n being an integer including zero) and in the central position of the support members, the support members are fixed at predetermined positions, but of course, the coupling position for the support members and the vibration member and the positions on the support members for fixing the support members may deviate from said predetermined positions within an allowable range.

What is claimed is:

1. A vibration wave driven actuator comprising:
   (a) a vibration member generating a travelling vibration wave of wavelength $\lambda$;
   (b) support members fixed to said vibration member along the direction of travel of said travelling vibration wave and with a spacing corresponding substantially to $(\lambda/2+n\lambda)$ (n being an integer including zero); and
   (c) means provided substantially at the central position of said support members for pivotably fixing said support members at predetermined positions.

2. A vibration wave driven actuator according to claim 1, wherein the lowest order flexural vibration frequency of said support members is higher than the frequency of the vibration wave of said vibration member.

3. A vibration wave driven actuator according to claim 1, wherein said support members are coupled to a (neutral plane of said vibration member.

4. A vibration wave driven actuator according to claim 1, wherein said support members are fixed to said vibration member with a spacing cOrresponding substantially to $3\lambda/2$.

5. A vibration wave driven actuator according to claim 4, wherein said support members are fixed to said vibration member with a spacing equal to or less than $(\lambda/2+3\lambda)$.

6. A vibration wave driven actuator according to claim 1, wherein the cross-section of said support members in a plane parallel to the direction of travel of said travelling vibration wave has radially extending projections or recesses.

7. A vibration wave driven actuator according to claim 1, wherein said support members generate vibration having n (n being an even number) loops when said vibration member generates said vibration wave.

8. A vibration wave driven actuator according to claim 7, wherein the number of the loops of the vibration generated in said support members is two.

9. A vibration wave driven actuator according to claim 7, wherein the number of the loops of the vibration generated in said support members is four.

10. A vibration wave driven actuator according to claim 1, further comprising means responsive to vibration generated in said support members to attenuate vibration generated in said fixing means.

11. A vibration wave driven actuator according to claim 1, wherein said fixing means has a shaft coupled to the central position of said support members, and a member for rotatably supporting said shaft.

12. A vibration wave driven motor comprising:
   (a) a vibration member generating a travelling vibration wave of wavelength $\lambda$;
   (b) support members fixed to said vibration member along the direction of travel of said travelling vibration wave and with a spacing corresponding to $(\lambda/2+n\lambda)$ (n being an integer including zero); and
   (c) means coupled to the central position of said support members for pivotably fixing said support members at predetermined positions.

13. A vibration wave driven actuator comprising:
   (a) a vibration member responsive to an applied electrical signal to generate a travelling vibration wave of wavelength $\lambda$, said vibration member and a contact member which contacts with said vibration member being moved relative to each other by said vibration wave;
   (b) first and second coupling shafts coupled to said vibration member along the direction of travel of said travelling vibration wave and with a spacing corresponding substantially to $(\lambda/2+n\lambda)$ (n being an integer including zero);
   (c) a rod member for connecting said first and second coupling shafts together;
   (d) a pivot shaft coupled to the substantially central position of said rod member; and
   (e) a fixed member for pivotably supporting said pivot shaft.

14. A vibration wave driven actuator comprising:
   (a) a vibration member generating a travelling vibration wave of wavelength $\lambda$;
   (b) a plurality support members, each said support member being fixed to said vibration member at points spaced corresponding substantially to $(\lambda/2+n\lambda)$ (n being an integer including zero); and
   (c) means provided substantially at a central position of each said support member for pivotably fixing each said support member at a predetermined position.

15. A vibration wave driven actuator according to claim 14, wherein the lowest order flexural vibration frequency of said support members is higher than the frequency of the vibration wave of said vibration member.

16. A vibration wave driven actuator according to claim 14, wherein said support members are coupled to a neutral plane of said vibration member.

17. A vibration wave driven actuator according to claim 14, wherein said support members are fixed to said vibration member with a spacing corresponding substantially to $3\lambda/2$.

18. A vibration wave driven actuator according to claim 17, wherein said support members are fixed to said vibration member with a spacing equal to or less than $(\lambda/2+3\lambda)$.

19. A vibration wave driven actuator according to claim 14, wherein the cross-section of said support members in a plane parallel to the direction of travel of said travelling vibration wave has radially extending projections or recesses.

20. A vibration wave driven actuator according to claim 14, wherein said support members generate vibration having n (n being an even number) loops when said vibration member generates said vibration wave.

21. A vibration wave driven actuator according to claim 20, wherein the number of the loops of the vibration generated in said support members is two.

22. A vibration wave driven actuator according to claim 20, wherein the number of the loops of the vibration generated in said support members is four.

23. A vibration wave driven actuator according to claim 14, further comprising means responsive to vibration generated in said support members to attenuate vibration generated in said fixing means.

24. A vibration wave driven actuator according to claim 14, wherein each said fixing means has a shaft coupled to the central position of its associated support member, and a member for rotatably supporting said shaft.

25. A vibration wave down actuation according to claim 14, wherein said fixing means pivots about an axis substantially perpendicular to the direction of travel of said travelling vibration wave.

26. A vibration wave down actuation according to claim 1, wherein said fixing means pivots about an axis substantially perpendicular to the direction of travel of said travelling vibration wave.

27. A vibration wave down actuation according to claim 12, wherein said fixing means pivots about an axis substantially perpendicular to the direction of travel of said travelling vibration wave.

* * * * *

UNITED STATES PATENT AND TRADEMARK OFFICE
CERTIFICATE OF CORRECTION

| | | |
|---|---|---|
| PATENT NO. : | 5,017,823 | Page 1 of 2 |
| DATED : | May 21, 1991 | |
| INVENTOR(S) : | ICHIRO OKUMURA | |

It is certified that error appears in the above-identified patent and that said Letters Patent is hereby corrected as shown below:

ON THE TITLE PAGE

In the FOREIGN PATENT DOCUMENTS:

Insert --0258449    3/1988    Europe
       63-198582    8/1988    Japan--.

COLUMN 1:

Line 22, "piezoelectric" should read --piezo-electric--.

COLUMN 3:

Line 13, "Embodiment 1" should be a heading.

COLUMN 4:

Line 2,  "Embodiment 2" should be a heading.
Line 62, "Embodiment 3" should be a heading.

COLUMN 6:

Line 38, "views" should read --view--.

COLUMN 7:

Line 22, "(neutral" should read --neutral--.
Line 25, "cOrresponding" should read --corresponding--.

UNITED STATES PATENT AND TRADEMARK OFFICE
CERTIFICATE OF CORRECTION

PATENT NO. : 5,017,823

DATED : May 21, 1991

INVENTOR(S) : ICHIRO OKUMURA

It is certified that error appears in the above-identified patent and that said Letters Patent is hereby corrected as shown below:

COLUMN 8:

Line 65, "vibration wave down actuation" should read --vibration wave driven actuator--.

COLUMN 9:

Line 1, "vibration wave down actuation" should read --vibration wave driven actuator--.

Line 5, "vibration wave down actuation" should read --vibration wave driven motor--.

Signed and Sealed this

Twentieth Day of October, 1992

*Attest:*

DOUGLAS B. COMER

*Attesting Officer*    *Acting Commissioner of Patents and Trademarks*